(12) United States Patent
Sugahara et al.

(10) Patent No.: US 6,483,944 B1
(45) Date of Patent: Nov. 19, 2002

(54) DATA CODING METHOD AND APPARATUS THEREFOR

(75) Inventors: Takayuki Sugahara, Kanagawa-ken (JP); Junzo Suzuki, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

(21) Appl. No.: 09/337,604

(22) Filed: Jun. 21, 1999

(30) Foreign Application Priority Data

Jul. 1, 1998 (JP) .......................................... 10-186385

(51) Int. Cl.[7] ................................................ G06K 9/36
(52) U.S. Cl. ........................ 382/232; 382/236; 382/253; 386/68; 386/95
(58) Field of Search ................................ 382/232, 236, 382/253; 386/68, 111, 95; 375/341; 360/22

(56) References Cited

U.S. PATENT DOCUMENTS 5,568,328 A * 10/1996 Takahashi et al. ............. 360/22
6,134,382 A * 10/2000 Mishima et al. ............... 386/68
6,345,074 B1 * 2/2002 Turk et al. .................... 375/341

FOREIGN PATENT DOCUMENTS

| EP | 0724264 | 7/1996 | .......... G11B/27/32 |
| EP | 0797199 | 9/1997 | .......... G11B/20/12 |
| EP | 0847198 | 6/1998 | .......... H04N/5/92 |
| JP | 2747268 | 2/1998 | .......... G11B/6/12 |

OTHER PUBLICATIONS

Bae et al., "On Fast Pitch Search of CELP Type Vocoder Using Decimation Technique", IEEE Digital signal Processing Applications, vol. 1, 1996, pp. 204–208.*
Khakoo, "Signature–Based Search Algorithm", IEEE Acoustics, Speech, and Signal Processing, International Conference on, vol. 3, 1989, pp. 1874–1877.*

* cited by examiner

*Primary Examiner*—Anh Hong Do
(74) *Attorney, Agent, or Firm*—Gary M. Nath; Harold L. Novick; Marvin C. Berkowitz

(57) ABSTRACT

A picture target amount-of-code calculating unit calculates a target amount of codes for each picture type that corresponds to an encoding rate that has been determined by an audio/video encoding rate determining unit. An amount-of-code controlling unit controls the quantizing scale of a quantizing unit so as to make the target amount of codes for each picture type match with a total amount of codes of a unit as a whole. A unit address calculating unit calculates the addresses used when a search is made, as navigation data, on the basis of the target amount of codes for each picture type and the encoding rate. A unifying unit makes a construction of the unit while, on the other hand, a navigation data producing unit depicts navigation data at a foremost position of the unit.

12 Claims, 9 Drawing Sheets

FIG.3
PRIOR ART

| 82 | | | |
|---|---|---|---|
| VIDEO OBJECT SET (VOBS) | | | |

| 83 | | | |
|---|---|---|---|
| VIDEO OBJECT (VOBU_IDN1) | VIDEO OBJECT (VOBU_IDN2) | | VIDEO OBJECT (VOBU_IDNj) |

| 84 | | | |
|---|---|---|---|
| CELL (C_IDN1) | CELL (C_IDN2) | | CELL (C_IDNj) |

| 85 | | | | |
|---|---|---|---|---|
| VIDEO OBJECT UNIT (VOBU) | VIDEO OBJECT UNIT (VOBU) | VIDEO OBJECT UNIT (VOBU) | | VIDEO OBJECT UNIT (VOBU) |

| 86 | 87 | 88 | | 90 | 91 | | | | | | | | | |
|---|---|---|---|---|---|---|---|---|---|---|---|---|---|---|
| NAV PACK | V PACK | V PACK | V PACK | SP PACK | A PACK | ----- | A PACK | SP PACK | V PACK | V PACK | V PACK | NAV PACK | ----- | A PACK |

DATA CODING METHOD AND APPARATUS THEREFOR

BACKGROUND OF THE INVENTION

1. Field of the Invention

The present invention concerns a data coding method and an apparatus therefor which enable, for example, coded audio and video data to be stored respectively into units, as a row of packs that is to be reproduced within a prescribed period of time. Especially, the invention concerns a data coding method and an apparatus therefor which make it possible to realize, while keeping the quality of a picture image stably, encoding before encoding of audio and video data that permits depiction of navigation data such as data length and starting address that are calculated from a value corresponding to the amount of codes of the coded data.

2. Related Art

In recent years, a data compaction system for use on a moving picture image has hitherto been internationally standardized as an MPEG (Moving Picture Image Coding Expert Group) system. This MPEG system is known as a system for performing variable compaction of video data. In the MPEG system, there are defined compaction systems which are called "PMEG 1" (MPEG phase 1) and "MPEG 2" (MPEG phase 2).

Concretely, the MPEG is prepared by several techniques being combined with one another. First, a time redundancy portion is reduced by subtracting a picture image signal that has been obtained by being decoded by a motion compensation unit from an input picture image signal.

As the method of prediction, there are three modes, as fundamental modes, i.e., a mode in which prediction is performed from past picture images, a mode in which prediction is performed from future picture images, and a mode in which prediction is performed from both past picture images and future picture images. Also, each of these modes can be used by being switched in units of a macroblock (MB) composed of 16 pixels×16 pixels. The method of prediction is determined according to the picture type ("Picture_Type") that has been imparted to an input picture image. As the picture types, there are a one-directional between-picture prediction encoded picture image (P-picture), bi-directional between-picture prediction encoded picture image (B-picture), and intra-picture independently encoded picture image (I-picture). In the P-picture type (one-directional between-picture prediction encoded picture image), there are two modes one of which is to encode by performing prediction from past picture images and the other of which is to independently encode a macroblock without performing relevant prediction. In the B-picture (bi-directional between-picture prediction encoded picture image), there are four modes, a first one of which is to perform prediction from future picture images, a second one of which is to perform prediction from past picture images, a third one of which is to perform prediction from both past picture images and future picture images, and a fourth one of which is to encode independently without performing any prediction. In the I-picture (intra-picture independently encoded picture image), all macroblocks are each independently encoded. It is to be noted that the I-picture is called "an intra-picture" and that, therefore, the one-directional between-picture prediction encoded picture image and the bi-directional between-picture prediction encoded picture image can each be referred to as "a non-intra-picture".

In the motion compensation, by performing pattern matching of the movement regions in units of a macroblock, a motion vector is detected with a half pixel precision and prediction is made after shifting of the macroblock to an extent corresponding to the thus-detected motion vector. The motion vector includes horizontal and vertical motion vectors, and this motion vector is transmitted as additional messages for macroblock along with an MC (Motion Compensation) mode that indicates where prediction is made from.

The pictures from the I-picture to a picture that immediately precedes the next I-picture are called "GOP (Group Of Picture)". In a case where pictures are used in accumulation media or the like, approximately 15 pictures or so are generally used as 1-GOP.

FIG. 1 illustrates a fundamental construction of a video encoder that is among audio/video encoding apparatus, to which the MPEG is applied.

In this FIG. 1, an input picture image signal is supplied to an input terminal 101. This input picture image signal is sent to a calculating unit 102 and to a motion compensation and prediction unit 111.

In the calculating unit 102, a difference between a picture image signal, which has been decoded in the motion compensation and prediction unit 111, and the input picture image signal is determined, and a picture image signal corresponding to this difference is sent to a DCT unit 103.

In the DCT unit 103, the differential picture image signal that has been supplied is subjected to orthogonal transformation. Here, the DCT (Discrete Cosine Transform) means an orthogonal transformation through which an integrating transformation that uses a cosine function as an integrating kernel is changed to a discrete transformation that is made into a finite space. In the MPEG system, two-dimensional DCT is performed of 8×8 DCT blocks that have been obtained by dividing the macroblock into four parts. It is to be noted that in general a video signal is composed of a large amount of low frequency band components and a lesser amount of high frequency band components and that, therefore, when performing DCT, the coefficients thereof are concentratedly gathered into the low band. Data that has been obtained by performance of the DCT in the DCT unit 103 is sent to a quantizing unit 104.

In the quantizing unit 104, quantization is performed of the DCT coefficients from the DCT unit 103. In the quantization performed in this quantizing unit 104, a two-dimensional frequency 8×8, which constitutes a quantizing matrix is weighted by visual characteristics. The value that has been resultantly obtained is further made scalar-fold by a quantizing scale. And using the thus-obtained value as a quantizing value, the DCT coefficient is divided by this value. It is to be noted that when performing inverse quantization, by a decoder (video decoder), of coded data after the encoding performed by this video encoder, multiplication of it is made by the quantizing value that was used in the video encoder. As a result of this, it is possible to obtain a value that is approximate to the original DCT coefficient. Data that has been obtained by the quantization made in the quantizing unit 104 is sent to a variable length coder 105 (VLC).

The VLC 105 performs variable length coding on the quantized data from the quantizing unit 104. In this VLC 105, of the quantized values, with respect to direct current (DC) components, coding is performed using DPCM (differential pulse code modulation) that is one of the prediction coding techniques. On the other hand, with respect to alternating current (AC) components, so-called "Huffman coding" is performed in which so-called "zigzag scan" is performed from a low band to a high band and, by counting the run length and effective coefficient value of a zero as being one piece of significant event, a code having a shorter code length is allotted to the data sequentially from one, the probability of whose occurrence is higher. Also, to the VLC 105 there are also supplied from the motion compensation and prediction unit 111 motion vector and prediction mode messages, whereby the VLC 105 outputs these motion vector and prediction mode messages as well as the variable coded data as additional data with respect to the macroblock. Data that has been obtained by the variable length coding performed in the VLC 105 is sent to a buffer memory 106.

The buffer memory 106 temporarily stores therein the variable length coded data from the VLC 105. Thereafter, the coded data (the coded bit stream) that has been read out from the buffer memory 106 at a prescribed transfer rate is output from an output terminal 113.

Also, the amount of codes generated in macroblock units that regards the thus-outputted coded data is transmitted to an amount-of-code controlling unit 112 as later described. The amount-of-code controlling unit 112 determines an error amount of code that is the difference between the amount-of-code generated and a target amount of code in macroblock units, and produces an amount-of-code control signal that corresponds to the error amount-of-code and thereby feeds it back to the quantizing unit 104, thereby performing control of the amount-of-code generated. The amount-of-code control signal that is fed back to the quantizing unit 104 in order to perform the amount-of-code control is a signal for controlling the quantizing scale in the quantizing unit 104.

On the other hand, picture image data that has been quantized in the quantizing unit 104 is also sent to an inversely quantizing unit 107.

The inversely quantizing unit 107 performs inverse quantization of the quantized data that has been sent from the quantizing unit 104. DCT coefficient data that has been obtained through the operation of this quantization is sent to an inverse DCT unit 108.

The inverse DCT unit 108 performs inverse DCT of the DCT coefficient data from the inversely quantizing unit 107 and thereafter sends the resulting data to a calculating unit 109.

The calculating unit 109 adds a predicted differential picture image from the motion compensation and prediction unit 111 to the output signal of the inverse DCT unit 108. As a result of this, a picture image signal is restored.

The thus-restored picture image signal is temporarily stored in a picture image memory 110 and thereafter is read out and sent to the motion compensation and prediction unit 111.

The picture image signal that has been sent from the picture image memory 110 to the motion compensation and prediction unit 111 is used for the purpose of producing a decoded picture image that serves as a reference for calculating a differential picture image in the calculating unit 102.

The motion compensation and prediction unit 111 detects a movement vector from the input picture image signal and shifts the picture image by the extent corresponding to a size of the thus-detected movement vector and thereafter performs prediction. A predicted differential picture image signal that has been obtained by this prediction is sent to the calculating units 102 and 109. Also,the movement vector that has been detected by the motion compensation and prediction unit 111 is sent to the VLC 105 together with the prediction mode (MC mode) message.

It is to be noted that the picture image on which coding of the differential picture image signal is performed as mentioned above is one of the P-picture and B-picture types, and that, in the case of a picture image of the I-picture type, the input picture image signal is coded as is.

FIG. 2 illustrates a fundamental construction of a video decoder that decodes coded data that has been coded by the video encoder illustrated in FIG. 1.

In this FIG. 2, a coded data is supplied to an input terminal 121. The coded data is sent to a variable length decoding unit 122 (VLD). The VLD 122 performs variable length decoding on the data that is inverse processing of the variable length coding in the VLC 105 of FIG. 1. Data that is obtained by the variable length decoding corresponds to one that has been prepared by addition of the movement vector message and the prediction mode message to the quantized data, which is an input to the VLC 105 of FIG. 1. The quantized data that has been obtained by the variable length decoding performed in the VLD 122 is sent to an inversely quantizing unit 123.

The inversely quantizing unit 123 performs inverse quantization of the quantized data from the VLD 122. Data that has been obtained by this inverse quantization corresponds to the DCT coefficient data that is an input to the quantizing unit 104 of FIG. 1. DCT coefficient data that has been obtained by inverse quantization performed in the inversely quantizing unit 123 is sent to an inverse DCT 124. Also, the movement vector and prediction mode messages are sent from the inversely quantizing unit 123 to a motion compensation and prediction unit 127.

The inverse DCT 124 performs inverse DCT of the DCT coefficient from the inversely quantizing unit 123. Data that has been obtained by the inverse DCT performed in the inverse DCT unit 124 corresponds to the differential picture image signal that is an input to the DCT unit 103 of FIG. 1. The differential picture image signal that has been obtained by the inverse DCT performed in the inverse DCT unit 124 is sent to a calculating unit 125.

The calculating unit 125 adds the predicted difference picture image from the motion compensation and prediction unit 127 to the differential picture image signal from the inverse DCT unit 124. As a result of this, decoded data, i.e., picture image signal is restored. The thus-restored picture image signal substantially corresponds to the input picture image signal to the input terminal 101 of FIG. 1. This restored picture image signal (decoded data) is output from an output terminal 128 and simultaneously is temporarily stored in a picture image memory 126 and thereafter is sent to the motion compensation and prediction unit 127.

The motion compensation and prediction unit 127 produces, on the basis of the movement vector and prediction mode, a predicted differential picture image from the picture image signal that has been supplied from the picture image memory 126, and sends this predicted differential picture image to the calculating unit 125.

Although in the MPEG2 it is defined as previously mentioned that setting is made of the transfer-starting time and reproduction time each of which represents video data and audio data with the use of a reference time so as to enable transfer and reproduction with the both data being in synchronism with each other, it is pointed out that although with mere use of only such transfer-starting time and reproduction time messages no problem would exist with normal reproduction, it is difficult to perform specific reproductions such as fast-forwarding reproduction, reverse-winding reproduction, random reproduction, etc. or reproduction processing such as one causing interactiveness to be had in the system.

Under the above-described circumstances, as disclosed in Japanese Patent Application Laid-Open No. 8-273304, there exists an application that is arranged to store audio and video data that has been encoded using the MPEG into an video object unit as a row of packs that is to be reproduced within a prescribed period of time and further to record reproduction message for making a reproduction of this row of packs and search message for making a search, at a foremost position of the packs row as navigation data.

Since the video object unit and navigation data are already disclosed and described in detail in Japanese Patent Application Laid-Open No. 8-273304 a detailed description thereof is omitted but the video object units 85 constitute a cell 84 by being plurally grouped as shown in FIG. 3. Also, the cells 84 constitute a video object 83 by being plurally grouped. Further, these video objects 83 constitute a video object set 82 by being plurally grouped.

The video object unit 85 is defined as a packs row having one piece of navigation pack 86 at a foremost position. Also, within the video object unit 85 there are disposed video packs 88, sub-video packs 90 and audio packs 91 that are determined in the MPEG standard. Also, the video object units 85 have allotted thereto numbers in the sequential order of reproduction, respectively, and the reproduction period of time for reproducing the video object unit 85 corresponds to the reproduction period of time for reproducing video data that is composed of a singular or plural piece of GOPs that are included in the video object unit 85.

In the navigation pack 86 there are disposed as navigation data a reproduction control message for reproducing the video object unit 85, search message for making a search, etc. The reproduction control message is navigation data for making presentation in synchronism with the state of reproduction of video data within the video object unit 85, namely for making an alteration of the contents displayed. Namely, the reproduction control message is a message for determining the reproduction conditions in accordance with the state of presentation data, namely real-time control data that has been dispersed and disposed on a data stream. Also, the search message is navigation data for executing search of the video object unit 85. Namely, the search message is a message for performing seamless reproduction as well as forward fast winding/reverse fast winding reproduction, namely real-time control data that has been dispersed and disposed on a data stream.

Especially, in the search message for making a search of the video object unit 85, there is depicted a message for particularizing the foremost address within the cell 84. Namely, in the search message for searching for the video object unit 85, numbering the video object unit 85 including the search message as being the 0-th unit serving as a reference, the numbers (start addresses) of the video object units 85 of, from the 1st (+1) to the 20th (-20), the 60th (+60), the 120th (+120), and the 240th (+240) in this order are depicted as addresses (forward addresses) for performing forward reproduction of the units in the sequential order of reproduction thereof. Similarly, in the search message for searching for the video object unit 85, numbering the video object unit 85 including the search message as being the 0th unit serving as a reference, the start addresses of the video object units 85 of, from the 1st (-1) to the 20th (-20), the 60th (-60), the 120th (-120), and the 240th (-240) in this order are depicted as addresses (backward addresses) for performing reverse reproduction of the units in a direction reverse to that in the sequential order of reproduction thereof.

By the way, in order to depict into the navigation pack, before starting the MPEG coding, navigation data that contains the above described reproduction message for making a reproduction of the video object unit and the search message for making a search therefor, it is necessary to use a memory having a storage capacity that corresponds to at least one video object unit. In addition, navigation data must be produced by, after this coding has been finished, observing and measuring the coded results (the amount of codes) and thereby calculating prescribed reproduction data. Although the storage capacity of the memory in this case depends on the number of the pictures contained in the video object unit as well as on the coding rate, even a general size of unit whose pictures number is 15 pieces and whose coding rate is to an extent of 5 Mbps (megabit/sec.) necessitates a storage capacity of even 31 K byte or more. As a result, an excessively large storage capacity of memory becomes inconveniently necessary.

Also, as described in Japanese Patent Application Laid-Open No. 8-273304, in a case where, by numbering the above-mentioned video object unit to be the 0th unit in the sequential order of reproduction, it is attempted, using this video object unit as a reference, to depict the addresses of the video object units that are reproduced up to at least the forward and backward 15th units as counted in the sequential order of reproduction, and to depict the addresses of the 20th, 30th, 60th, 120th, and 240th video object units as counted in the sequential order of reproduction, since the coded data of the MPEG video data is basically one that has been prepared by variable length coding, it is impossible to calculate the addresses of the video object units unless all the video coded data has been already prepared. Accordingly, it is impossible to perform real-time coding and recording of navigation data.

SUMMARY OF THE INVENTION

The present invention has been made in view of the above-described problems and has an object to provide a data coding method and an apparatus therefor which enables the depiction of navigation data for depicting a reproduction control message for reproducing the video object unit and a search message for making a search, before the encoding is started, without requiring the use of an excessively large capacity of storage memory and, whatever the encoding rate may be like, enables real-time encoding and depiction of navigation data while maintaining the picture quality to be at an optimum level.

To attain the above object, according to an aspect of the present invention, there is provided a data coding method wherein input data in prescribed data units is classified into a data type whose data items are independently encoded and a data type whose data items are encoded by being mutually related between each two thereof and the data items are encoded according to their respective data type, whereby the thus-encoded data items are made up into a row of packs that is to be reproduced within a prescribed period of time and are stored into a unit, the data coding method comprising: determining an encoding rate, determining a target amount of codes for each data type that corresponds to the encoding rate, encoding the input data for each data type so that the coded data may be in conformity with the target amount of codes, determining, on the basis of the encoding rate and the target amount of codes, addresses of a reference unit for making a search and a prescribed number of units that are reproduced at least before and after the reference unit and an ending address at which there is ended at least data of the data type having its data items independently encoded, of the data within the unit, constructing as the unit the coded data that has been obtained by being encoded so that the coded data may be in conformity with the target amount of codes, and depicting at a foremost position of the unit the addresses of the unit and the ending address at which data of the data type having its data items independently encoded is ended.

According to the present invention, it is possible to record before the encoding is started the addresses for depicting the reproduction control message for reproducing the unit and the search message for making a search without requiring the use of an excessively large storage capacity of memory. In addition, it is possible to determine the target amount of codes for each data type that corresponds to the encoding rate. Therefore, by, when performing encoding, making the thus-determined values ones at which the quality of the signals becomes statistically the most excellent, it becomes possible, whatever the encoding rate may be like, to perform encoding while maintaining the quality of the signal to be at an optimum level.

In a preferred embodiment of the present invention, when the input data is encoded so that the coded data may be in conformity with the target amount of codes, the encoding of the input data is performed in a temporary amount of codes that has been prepared by setting the amount of codes to be at a value smaller by a prescribed amount of codes than the target amount of codes, and the difference between an amount of codes generated by the encoding performed into the temporary target amount of codes and the target amount of codes is adjusted using invalid bits, thereby encoding the input data so that the coded data may be in conformity with the target amount of codes.

According to this embodiment, since the amount of codes can be very accurately controlled, it is possible to make very low the possibility that actual coded data and the addresses will become inconsistent with each other.

In a preferred embodiment of the present invention, determination is made of a total amount of codes of the unit as a whole from the target amount of codes for each data type.

Also, to attain the above object, according to another aspect of the present invention, there is provided a data coding apparatus wherein input data in prescribed data units is classified into a data type whose data items are independently encoded and a data type whose data items are encoded by being mutually related between each two thereof and the data items are encoded according to their respective data type, whereby the thus-encoded data items are made up into a row of packs that is to be reproduced within a prescribed period of time and are stored into a unit, the data coding apparatus comprising: encoding rate determining means for determining an encoding rate, target amount-of-code determining means for determining a target amount of codes for each data type that corresponds to the encoding rate, amount-of-code control means for encoding the input data for each data type so that the coded data may be in conformity with the target amount of codes, address determining means for determining, on the basis of the encoding rate and the target amount of codes, addresses of a reference unit for making a search and a prescribed number of units that are reproduced at least before and after the reference unit and an ending address at which there is ended at least data of the data type having its data items independently encoded, of the data within the unit, unifying means for constructing as the unit the coded data that has been obtained by being encoded so that the coded data may be in conformity with the target amount of codes, and depicting means for depicting at a foremost position of the unit the addresses of the unit and the ending address at which data of the data type having its data items independently encoded is ended.

According to the present invention, it is possible to record before the encoding is started the addresses for depicting the reproduction control message for reproducing the unit and the search message for making a search without requiring the use of an excessively large storage capacity of memory. In addition, it is possible to determine the target amount of codes for each data type that corresponds to the encoding rate. Therefore, by, when performing encoding, making the thus-determined values ones at which the quality of the signals becomes statistically the most excellent, it becomes possible, whatever the encoding rate may be like, to perform encoding while maintaining the quality of the signal to be at an optimum level.

In a preferred embodiment of the present invention, the amount-of-code control means comprises: temporary target amount-of-code producing means for producing a temporary amount of codes that has been prepared by setting the amount of codes to be at a value smaller by a prescribed amount of codes than the target amount of codes, and adjusting means for adjusting an amount of codes by adjusting the difference between an amount of codes generated by the encoding performed into the temporary target amount of codes and the target amount of codes by using invalid bits.

According to this embodiment, since the amount of codes can be very accurately controlled, it is possible to make very low the possibility that actual coded data and the addresses will become inconsistent with each other.

In another preferred embodiment, the amount-of-code control means determines a total amount of codes of the unit as a whole from the target amount of codes for each data type.

In still another preferred embodiment, the target amount-of-code determining means has storage means having stored previously therein a target amount-of-code value for each data type that corresponds to a prescribed encoding rate.

According to this preferred embodiment, it is possible to simplify the construction.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is an explanatory diagram illustrating the construction of a video object set in which video object units and navigation data are disposed;

DESCRIPTION OF THE PREFERRED EMBODIMENTS

Embodiments of the present invention will now be explained with reference to the drawings.

Figure 4:
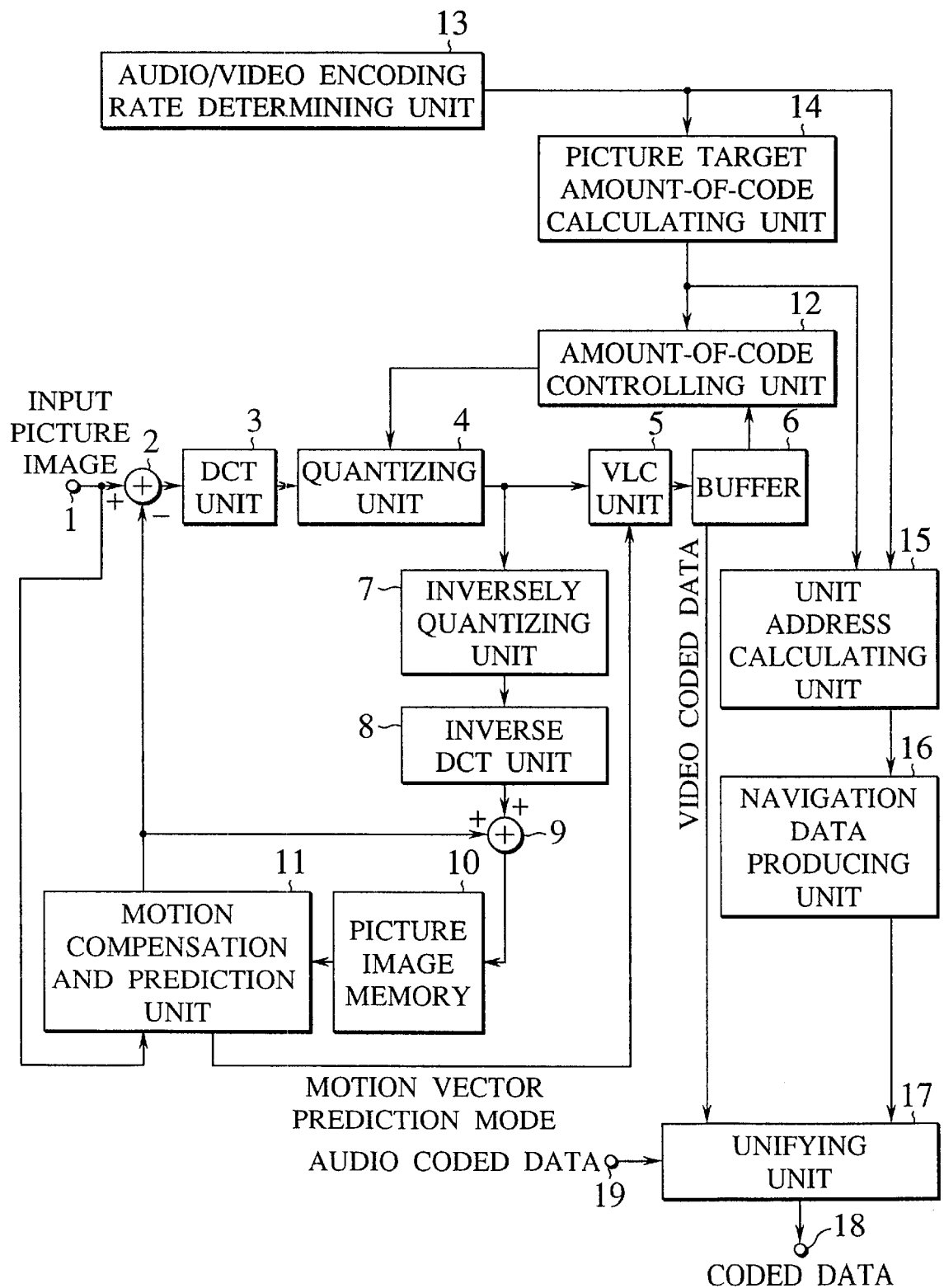
FIG. 4 is a block diagram illustrating a schematic construction of an audio/video encoding apparatus according to a first embodiment of the present invention.

FIG. 4 illustrates a schematic construction of an audio/video encoding apparatus according to a first embodiment to which a data coding method and an apparatus therefor of the present invention are applied. It is to be noted that in FIG. 4 illustration is made mainly of the construction of a video encoder for performing encoding of video data and no illustration is made of the construction of an audio encoder for performing encoding of audio data.

In this FIG. 4, an input picture image signal is supplied to an input terminal 1 and this input picture image signal is sent to a calculating unit 2 and a motion compensation and prediction unit 11.

In the calculating unit 2, a difference between the picture image signal that has been obtained by decoding performed by the motion compensation and prediction unit 11 and the input picture image signal is determined, and this differential picture image signal is sent to a DCT unit 3. It is to be noted that the input picture image signals of which the differential picture image signal is encoded are only of the P-picture and B-picture type and that, in a case where the input picture image signal is of the I-picture, this signal is encoded as is. However, in the following description, an explanation will be given of the case where a differential picture image signal is encoded, as an example.

In a DCT unit 3, the differential picture image signal that has been supplied is subjected to orthogonal transformation. Data (DCT coefficient) that has been obtained by DCT performed in the DCT unit 3 is sent to a quantizing unit 4.

In the quantizing unit 4, the DCT coefficient from the DCT unit 3 is quantized and the thus-quantized data is sent to a variable length encoding unit 5 (VLC).

In the VLC 5, the quantized data from the quantizing unit 4 is variable-length-encoded. Also, to the VLC 5 there are also supplied the motion vector and prediction mode from the motion compensation and prediction unit 11, whereby the VLC 5 outputs, together with the variable length encoded data, the motion vector data and the prediction mode data, as additional messages to a macroblock. Data that has been obtained by the variable length encoding performed in the VLC 5 is temporarily stored in a buffer memory 6 and thereafter is read out from the buffer 6 at a prescribed transfer rate. The thus-read-out data is sent as video encoded data to a unifying unit 17 as later described.

Also, the amount of codes generated in macroblock units, of the video encoded data that is output from the buffer memory 6 is sent to an amount-of-code control unit 12. The amount-of-code control unit 12 determines an error amount of codes that is a difference between the amount of codes generated in macroblock units and a picture target amount of codes as later described to thereby produce an amount-of-code control signal that corresponds to the error amount of codes and feed it back to the quantizing unit 4, thereby performing control of the amount of codes generated. The amount-of-code control signal that is fed back to the quantizing unit 4 for controlling the amount of codes is a signal that is for the purpose of controlling the quantizing scale in the quantizing unit 4.

On the other hand, the picture image data that has been quantized is also sent to an inversely quantizing unit 7.

The inversely quantizing unit 7 performs inverse quantization of the quantized data from the quantizing unit 4. The DCT coefficient data that has been obtained by this inverse quantization is sent to an inverse DCT unit 8.

The inverse DCT unit 8 performs inverse DCT of the DCT coefficient data from the inversely quantizing unit 7 and thereafter sends the resulting data to a calculating unit 9.

The calculating unit 9 performs addition between the predicted differential picture image from the motion compensation and prediction unit 11 and the signal from the inverse DCT unit 8. As a result of this, the picture image signal is restored. The thus-restored picture image signal is stored temporarily into a picture image memory 10 and then is sent to the motion compensation and prediction unit 11. The picture image signal that has been sent from the picture image memory 10 to the motion compensation and prediction unit 11 is used to produce a decoded picture image serving as a reference for calculating the differential picture image in the calculating unit 2.

The motion compensation and prediction unit 11 detects the motion vector from the input picture image signal and, after shifting the picture image by the extent corresponding to the movement of the thus-detected motion vector, performs prediction. The predicted differential picture image signal that has been obtained by this prediction is sent to the calculating unit 2 and the calculating unit 9. Also, the motion vector that has been detected in the motion compensation and prediction unit 11 is sent to the VLC 5 together with the prediction mode (MC mode) message.

Figure 1:
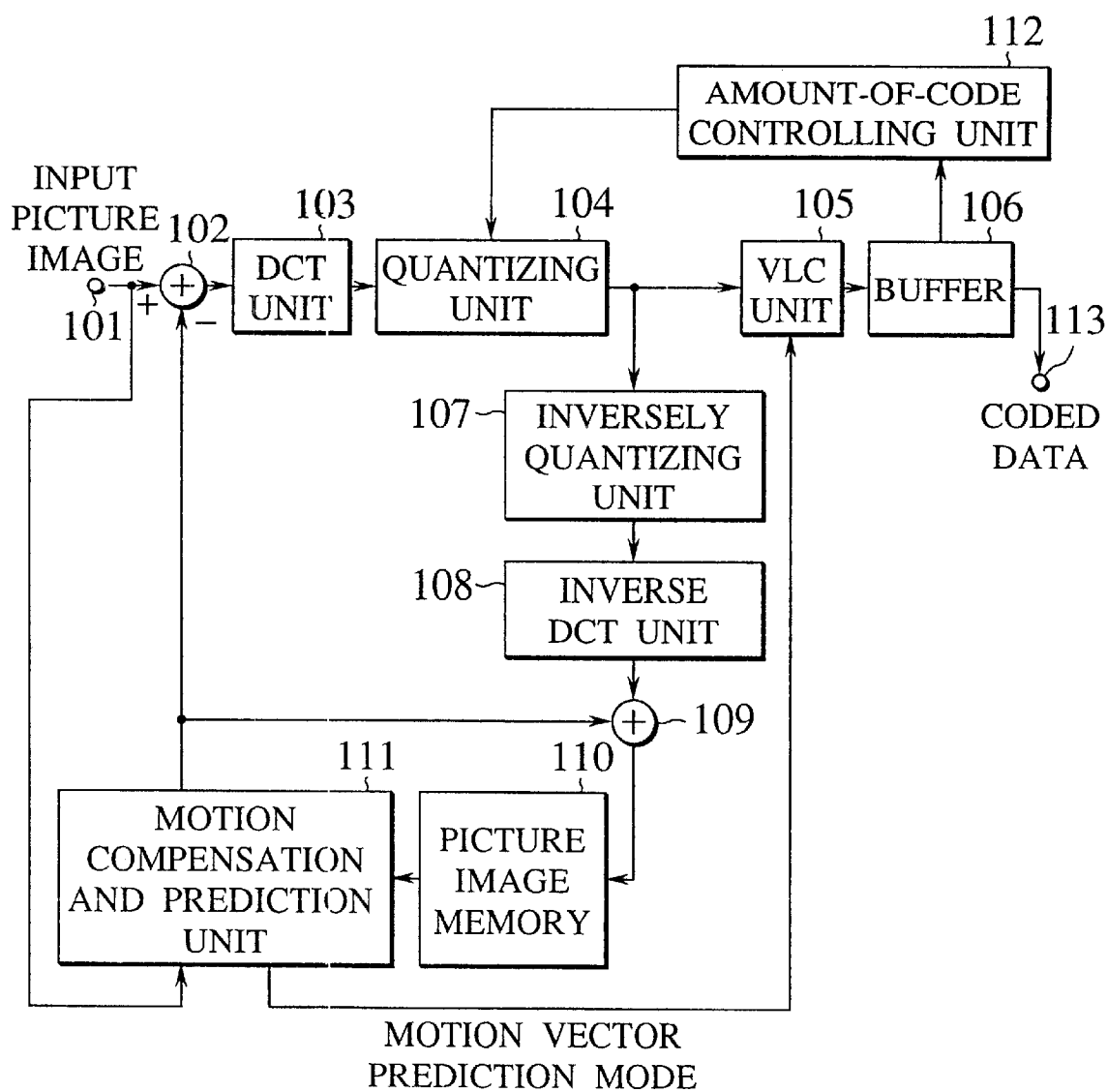
FIG. 1 is a block diagram illustrating a schematic construction of a conventional video encoder.
Figure 2:
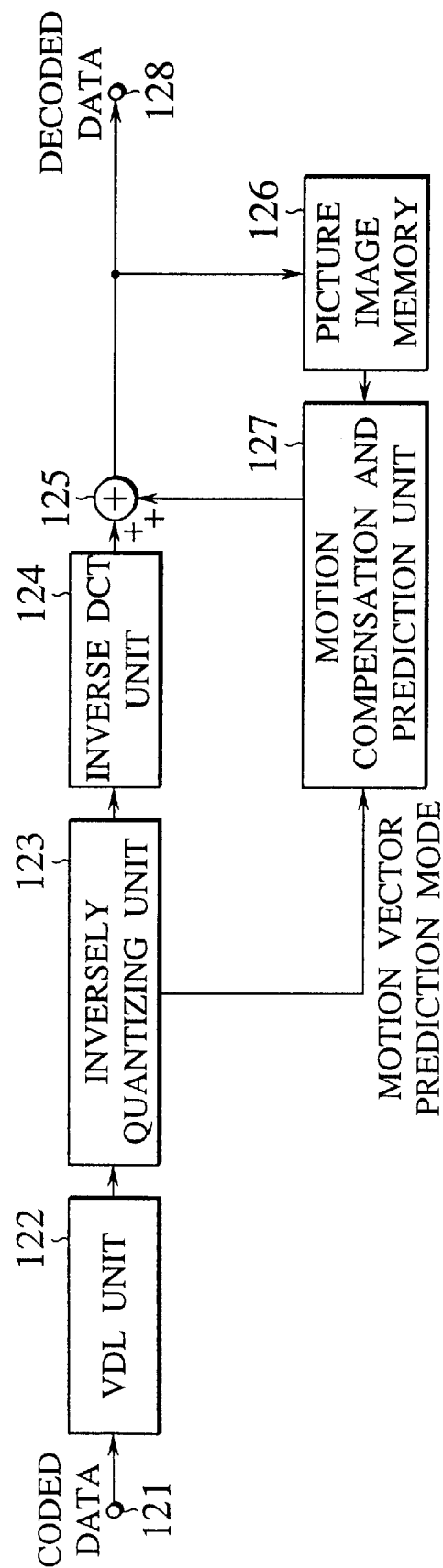
FIG. 2 is a block diagram illustrating a schematic construction of a conventional video decoder.

Although the construction that has been described up to here is substantially the same as that illustrated in FIG. 1, the audio/video encoding apparatus according to the first embodiment of the present invention further has the following construction.

In an audio/video encoding rate determining unit 13, the audio and video encoding rates of the audio and video signals that are to be encoded from now onward are determined. It is to be noted that the encoding rates for audio and video signals may be determined by a user or may automatically be set. The thus-determined encoding rate messages are sent to a picture target amount-of-code calculating unit 14 and a unit-address-calculating unit 15.

The picture target amount-of-code calculating unit 14 calculates a target amount of codes for each picture type defined in the MPEG system, according to the encoding rate message that has been supplied from the audio/video rate determining unit 13.

Assuming that, for example, the target amount of codes of the I-picture type signals is represented by $T(I)$, the target amount of codes of the P-picture type signals is represented by $T(P)$, and the target amount of codes of the B-picture type signals is represented by $T(B)$, and that the GOP interior has a construction wherein I-picture is one piece, P-picture is 4 pieces, and B-picture is 15 pieces, the calculation equations of the target amount of codes are as expressed in, for example, the following equations (1)~(3) provided, however, that the N in each equation is a video transfer rate (Mbps).

$$T(I) = 100 \times N (k \text{ bits}) \quad (1)$$

$$T(P) = 40 \times N (k \text{ bits}) \quad (2)$$

$$T(B) = 24 \times N (k \text{ bits}) \quad (3)$$

The picture target amount-of-code calculating unit 14 determines the target amount of codes of each picture type by the use of the calculation equations that are expressed as in the above equations (1)–(3).

The target amount-of-code messages that have thus been determined are transmitted to the amount-of-code controlling unit 12 and the unit address calculating unit 15.

Figure 5:
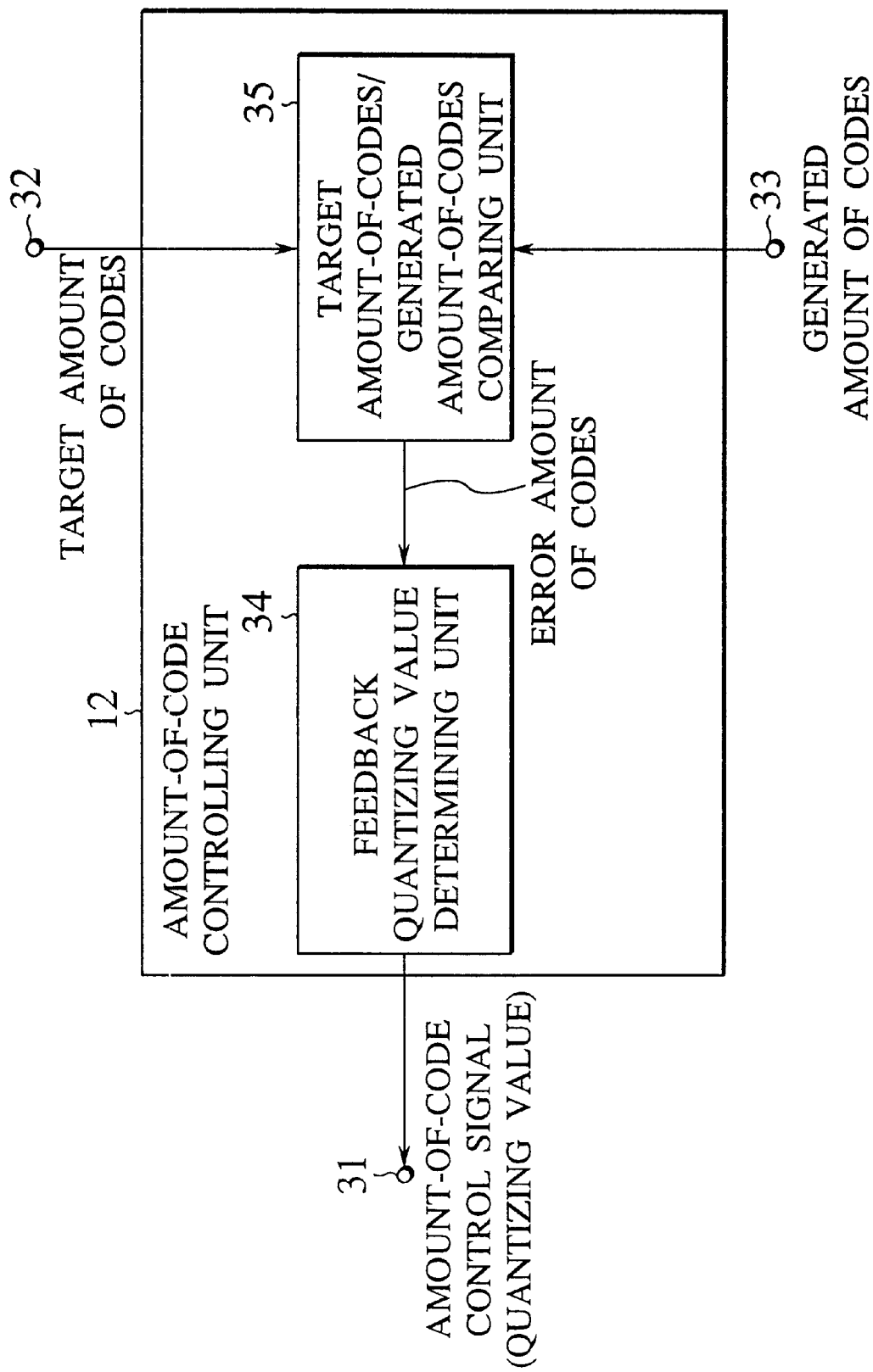
FIG. 5 is a block diagram illustrating a concrete construction of an amount-of-code control unit of the audio/video encoding apparatus according to the first embodiment of the present invention.

Here, the processing that is performed in the amount-of-code controlling unit 12 in the audio/video encoding apparatus according to this embodiment will hereafter be explained using FIG. 5.

In this FIG. 5, to a terminal 33 of the amount-of-code controlling unit 12 there is input a generated amount-of-code message in microblock units that is output from the buffer memory 6. Also, to a terminal 32 there is input a target amount-of-code message that has been determined in the picture target amount-of-code calculating unit 14. And from a terminal 31 there is output an amount-of-code control signal (a signal for controlling the quantizing scale, i.e., quantizing value) with respect to the quantizing unit 4.

In a target amount-of-code/generated amount-of-code comparing unit 35, comparison is made between the generated amount of codes that has been supplied from the buffer memory 6 through the terminal 33 and the target amount of codes that has been supplied from the picture target amount-of-code calculating unit 14 through the terminal 32, thereby producing an error amount of codes that is a difference between the target amount of codes and the generated amount of codes. This error amount-of-code message is sent to a feedback quantizing-value determining unit 34.

The feedback quantizing-value determining unit 34 accumulates, for example, the error amount of codes for a prescribed period of time and, when this error amount of codes indicates that the generated amount of codes is larger than the target amount of codes, sets the amount-of-code control signal so that the quantizing value may become large in proportion to this error amount of codes (makes the quantizing scale large). On the other hand, when the error amount of codes indicates that the generated amount of codes is smaller than the target amount of codes, the unit 34 sets the amount-of-code control signal so that the quantizing value may become small in proportion to this error amount of codes (makes the quantizing scale small). As a result of this, the amount of codes of each picture type is controlled to the target amount of codes that has been determined.

Turning back to FIG. 4, the target amount-of-code message that has been calculated by the picture target amount-of-code calculating unit 14 and the encoding rate message that has been determined by the audio/video encoding rate determining unit 13 are sent to the unit address calculating unit 15.

Figure 6:
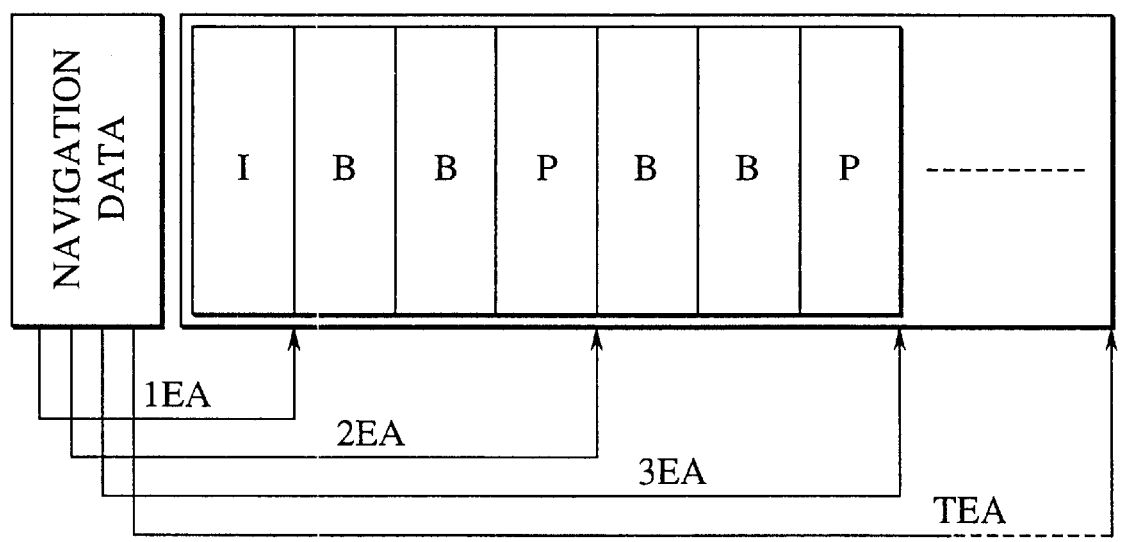
FIG. 6 is an explanatory diagram illustrating calculated contents of a unit address calculating unit.

In the unit address calculating unit 15, as shown in FIG. 6, an address TEA, address 1EA, and address 2EA are calculated as expressed in the following equations (4)–(6) by the use of the target amount-of-code message that has been calculated for each picture type by the picture target amount-of-code calculating unit 14 and the encoding rate message that is sent from the audio/video encoding rate determining unit 13, namely by using a video rate VR (kbps) and an audio rate AR (kbps). It is to be noted here that the address TEA is the addresses of a prescribed number of video object units that are reproduced at least before and after a video object unit for making a search with this object unit being used as a reference. Also, the address 1EA is the ending address of data that is capable of constituting the I-picture within the video object unit. Further, the address 2EA is the ending address of data that is capable of constituting the second P-picture within the video object unit.

$$TEA = (VR + AR) \times 15/29.97 \quad (4)$$

$$1EA = T(I) + AR \times 1/29.97 \quad (5)$$

$$2EA = T(I) + 2 \times T(B) + T(P) + AR \times 4/29.97 \quad (6)$$

where the unit of measure is k (killo-) bit. Also, here, it is assumed that it is already known that the video object unit constitutes exactly a IGOP with 15 frames and the B-picture existing between the I- and P-pictures is 2 pieces. Also, although it is assumed that audio data is transferred at a fixed transfer rate, that is, the number of samples per unit of time is fixed, if encoding of audio data is performed by variable length encoding, relevant calculation has only to be performed considering the amount of codes of the audio data that exists at a position corresponding to video data (i.e., that corresponds to a time at which the video data is output). Such a relevant calculation is possible by equipping the apparatus with the target amount-of-code calculating unit 14 or a target amount-of-code memory as later described for the purpose of using it for audio data.

As described above, according to the audio/video encoding apparatus of this embodiment, it is possible to calculate the amount of codes up to a position until which calculation is necessary and accordingly to calculate the addresses of the video object units. These calculated messages are sent to a navigation-data-producing unit 16.

The navigation data producing unit 16 determines this video object unit as being the 0-th unit as viewed in the sequential order of reproduction. And using this video object unit as a reference unit, the video object units that are reproduced up and back to the 15th units in the sequential order of reproduction, the ±20th, ±30th, ±60th, ±120th, and ±240th video object units, at least, as viewed in the sequential order of reproduction, have their addresses calculated by making the address scalar-fold if necessary, whereby the unit 16 lays them out in a prescribed sequential order of reproduction and sends them to the unifying unit 17.

The unifying unit 17 produces such video object units as have been explained in FIG. 3, by using the audio encoded data supplied from the terminal 19, video encoded data supplied from the buffer memory 6, and navigation data supplied from the navigation data producing unit 16, and outputs the encoded data that has been unified therein. Namely, the unifying unit 17 packets (packs) the navigation data that has been transmitted thereto, packets (packs) the video encoded data, audio encoded data, etc., disposes the packet of the navigation data (the navigation pack) at the foremost position, thereafter disposes the packet of the video data (the video pack), the packet of the audio data (the audio pack), etc., thereby produces a prescribed one video object unit, and sends this one video object unit. When the unifying unit 17 has finished transmission of the one video object unit, the unifying unit 17 receives navigation data for use in the production of a next unit and similarly unifies it. The encoded data that has been thus unified is output from the output terminal 18.

As has been described above, in the audio/video encoding apparatus according to the first embodiment of the present invention, it becomes possible to record, before the encoding is started, the navigation data that represents the reproduction control message for making a reproduction of the video object unit and the search message for making a search, without having a memory that would be unnecessary.

Also, in the audio/video encoding apparatus of this first embodiment, since it is possible to determine the target amount-of-code value in picture type units that corresponds to the encoding rate value, by, when performing the MPEG encoding of those values, making these values the values at which the quality of the picture image becomes statistically the best, the encoding becomes able to be performed while maintaining the quality of the picture image to be at an optimum level whatever the encoding rate may be like.

Figure 7:
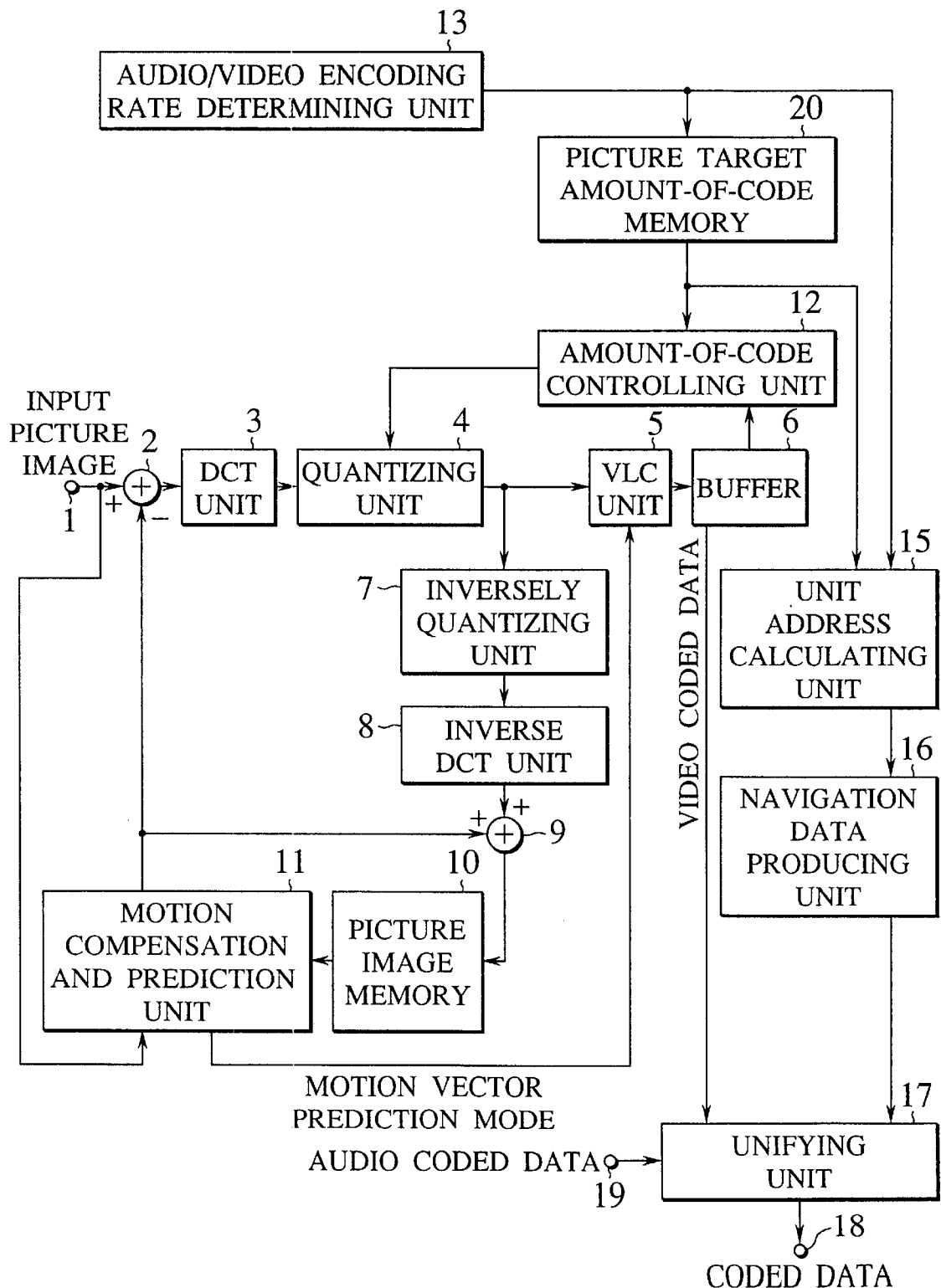
FIG. 7 is a block diagram illustrating a schematic construction of an audio/video encoding apparatus according to a second embodiment of the present invention.

Next, FIG. 7 illustrates a schematic construction of the audio/video encoding apparatus according to a second embodiment of the present invention. It is to be noted that, in the audio/video encoding apparatus illustrated in this FIG. 7, the same constituent elements as those in FIG. 4 are denoted by like reference symbols and an explanation thereof is omitted by making only an explanation of the constituent elements different from those in FIG. 4.

In the audio/video encoding apparatus according to the second embodiment illustrated in this FIG. 7, instead of the picture target amount-of-code calculating unit 14 of FIG. 4 there is provided a memory (picture target amount-of-code memory 20) that has recorded previously therein a table that has the target amount-of-code value in picture type units that corresponds to a prescribed encoding rate (transfer rate). Also, the audio/video amount-of-code rate determining unit 13 in the case of this second embodiment outputs eight kinds of rate messages that have been prepared by selecting the values from 1 M(mega)bps to 8 Mbps in units of 1 Mbps as the amount-of-code messages, and supplies them to the picture target amount-of-code memory 20.

Accordingly, from the picture target amount-of-code memory 20 there is output the target amount-of-code value in picture type units that corresponds to the rate message that has been obtained by any one of the eight kinds of rate messages being selected by the audio/video amount-of-code rate determining unit 13.

Table 1 shows an example of the table that has eight kinds of encoding rates (transfer rates) and the target amount-of-code values in picture type units that correspond thereto. Namely, the table on this Table 1 represents, in correspondence with the respective encoding rates (transfer rates) of eight kinds, the target amount of codes of the I-, P-, and B-pictures that has been set in an amount-of-code ratio according to which a general moving picture image in a case where the same has been encoded by the MPEG system becomes statistically the best in quality (S/N). It is to be noted that the picture target amount-of-code memory 20 may be a ROM which has stored therein the table of the Table 1.

TABLE 1

| Transfer rate | Type | | |
| --- | --- | --- | --- |
| | I-Picture | P-Picture | B-Picture |
| 1.0 Mbps | 100 kbit | 40 kbit | 24 kbit |
| 2.0 Mbps | 200 kbit | 80 kbit | 48 kbit |
| 3.0 Mbps | 300 kbit | 120 kbit | 72 kbit |
| 4.0 Mbps | 400 kbit | 160 kbit | 96 kbit |
| 5.0 Mbps | 450 kbit | 200 kbit | 125 kbit |

TABLE 1-continued

| Transfer rate | Type | | |
| --- | --- | --- | --- |
| | I-Picture | P-Picture | B-Picture |
| 6.0 Mbps | 475 kbit | 260 kbit | 148 kbit |
| 7.0 Mbps | 500 kbit | 300 kbit | 180 kbit |
| 8.0 Mbps | 525 kbit | 340 kbit | 211 kbit |

According to the audio/video encoding apparatus of this second embodiment, the same effects as those attainable with the audio/video encoding apparatus of the first embodiment are not only brought about but, because no calculation is needed of the picture target amount of codes, it is possible to achieve the simplification of the construction.

Figure 8:
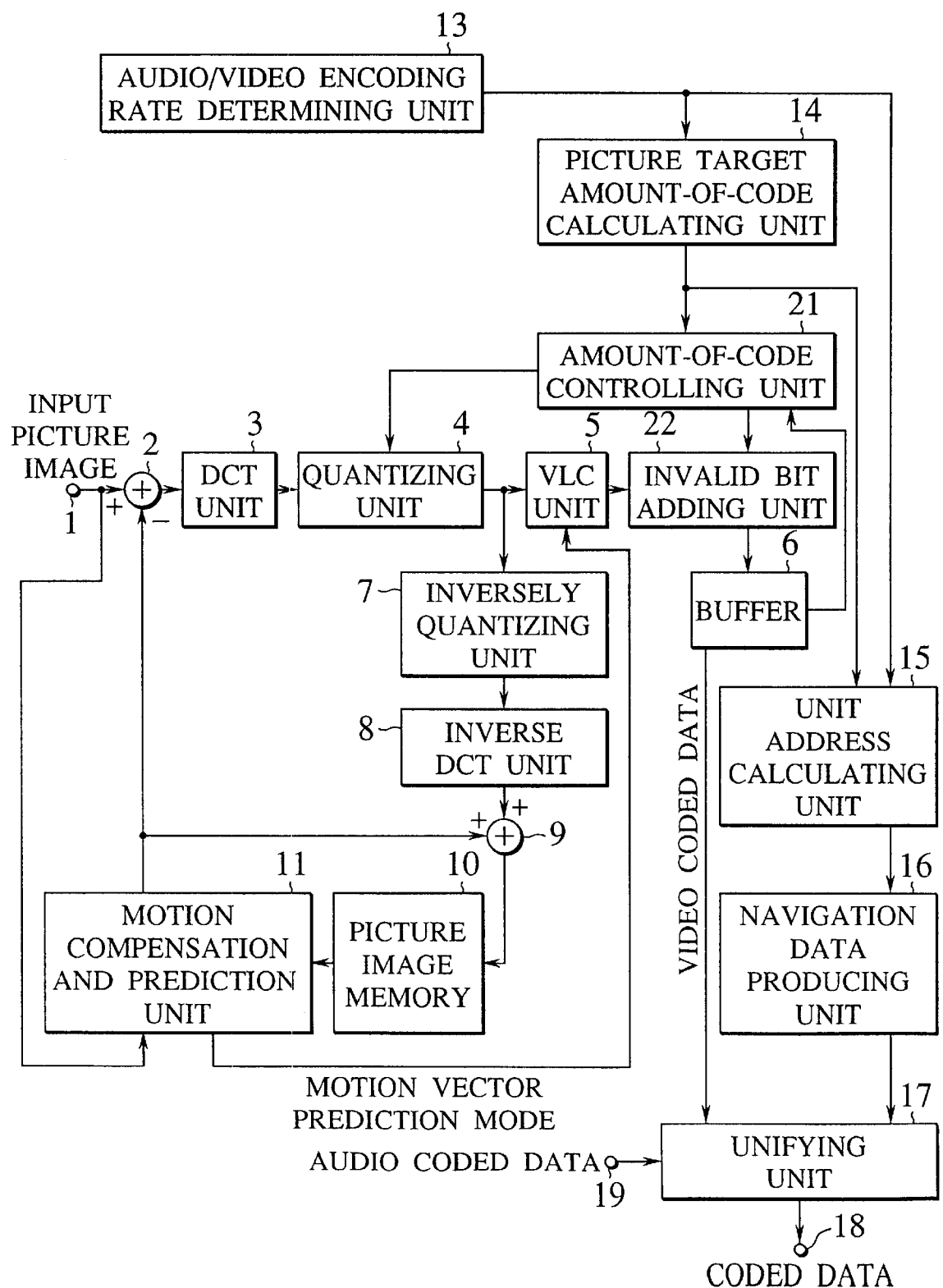
FIG. 8 is a block diagram illustrating a schematic construction of an audio/video encoding apparatus according to a third embodiment of the present invention.
Figure 9:
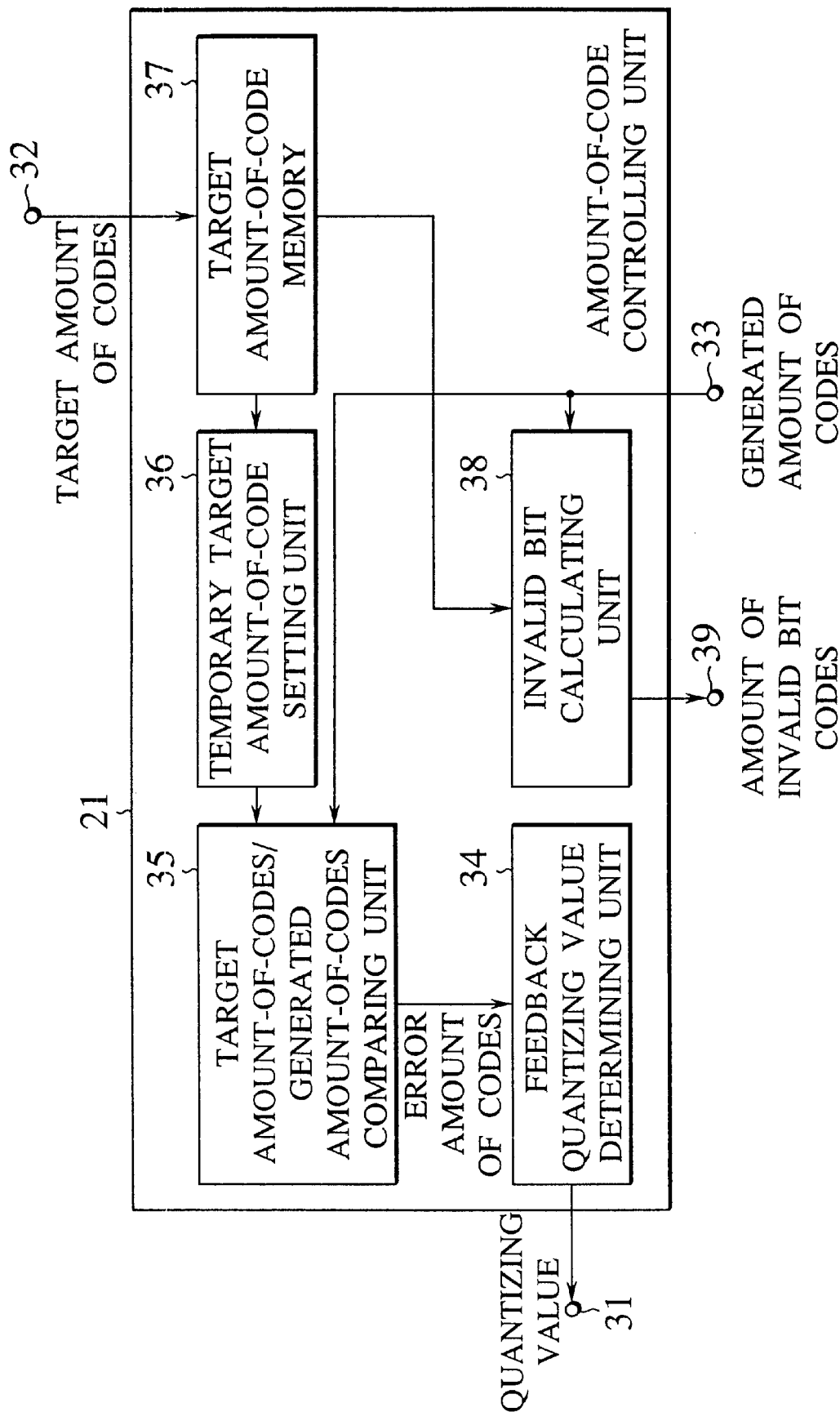
FIG. 9 is a block diagram illustrating a concrete construction of an amount-of-code control unit of the audio/video encoding apparatus according to the third embodiment of the present invention.

Next, FIG. 8 illustrates a schematic construction of the audio/video encoding apparatus according to a third embodiment of the present invention. Also, FIG. 9 illustrates a schematic construction of an amount-of-code controlling unit 21 of the audio/video encoding apparatus according to this third embodiment. It is to be noted that in FIGS. 8 and 9 the same constituent elements as those in FIGS. 4 and 5 are denoted by like reference symbols and an explanation thereof is omitted and only the constituent elements that are different from those in FIGS. 4 and 5 are explained.

In the audio/video encoding apparatus according to the third embodiment illustrated in FIG. 8, an invalid bit adding unit 22 as later described is provided between the VLC 5 and the buffer memory 6 and, in addition, the amount-of-code controlling unit 21 has a construction such as that illustrated in FIG. 9.

In the amount-of-code controlling unit 21 illustrated in FIG. 9, the generated amount-of-code message that has been supplied from the buffer memory 6 through the terminal 33 is sent to a target amount-of-code/generated amount-of-code comparing unit 35 and simultaneously is sent to the invalid bit calculating unit 38, too. Also, the target amount-of-code message that has been supplied from the picture target amount-of-code calculating unit 14 through the terminal 32 is sent to a target amount-of-code memory 37.

The target amount-of-code memory 37 temporarily accumulates the target amount-of-code message that has been supplied and thereafter read it out and supplies it to the temporary target amount-of-code setting unit 36 and the invalid bit calculating unit 38.

The temporary target amount-of-code setting unit 36 sets as a temporary target amount of codes the value that is approximately 10% or so smaller than the value of the target amount-of-codes that has been supplied from the target amount-of-code memory 37. This temporary target amount of codes is sent to the target amount-of-code/generated amount-of-code comparing unit 35.

Accordingly, in the case of this FIG. 9, the target amount-of-code/generated amount-of-code comparing unit 35 compares the generated amount of codes that has been supplied from the buffer memory 6 through the terminal 33 and the temporary target amount of codes that has been set by the temporary target amount-of-code setting unit 36 to thereby produce an error amount of codes that is an error or difference between the temporary target amount of codes and the generated amount of codes. This error amount-of-code message is sent to the feedback quantizing value determining unit 34.

The feedback quantizing value determining unit 34 accumulates the error amount of codes for a prescribed period of time and, in a case where this error amount of codes indicates that the generated amount of codes is larger than the temporary target amount of codes, sets the amount-of-code control signal so that the quantizing value may become large in proportion to the error amount of codes (makes the quantizing scale large). On the other hand, in a case where the error amount of codes indicates that the temporary target amount of codes is larger than the generated amount of codes, the unit 34 sets the amount-of-code control signal so that the quantizing value may become small in proportion to the error amount of codes (makes the quantizing scale small). By doing so, the amount of codes of each picture type is controlled to the temporary target amount of codes that has been determined.

The invalid bit calculating unit 38 adds, at the point in time when the encoding of the 1 picture data has been finished, the generated amount of codes in macroblock units that has been input beforehand from the buffer memory 6, thereby calculating the difference between a total generated amount of codes and target amount of codes of the 1 picture data. Then, the unit 38 outputs the amount of codes corresponding to the data the target amount of codes is short of, as invalid bit amount-of-code message. This invalid bit amount-of-code message is sent to the invalid bit adding unit 22 of FIG. 8 through the terminal 39.

The invalid bit adding unit 22 of FIG. 8 adds to the encoded data that has been supplied thereto from the VLC 5 the invalid bits that correspond to the invalid bit amount-of-code message from the amount-of-code controlling unit 21. As a result of this, the data output from the invalid bit adding unit 22 becomes data that has been accurately controlled to the target amount of codes, and this encoded data is sent to the buffer memory 6.

According to the audio/video encoding apparatus of this third embodiment, the same effects as those attainable with the audio/video encoding apparatus of the first embodiment are not only obtained but, since the amount of codes can be controlled very accurately, it is possible to lessen the possibility very much that the contents of the navigation data and the actual amount of encoded data will become inconsistent with each other.

It should be understood that many modifications and adaptations of the invention will become apparent to those skilled in the art and it is intended to encompass such obvious modifications and changes in the scope of the claims appended hereto.

What is claimed is:

1. A data coding method wherein input data in prescribed data units is classified into a data type whose data items are independently encoded and a data type whose data items are encoded by being mutually related between each two thereof and the data items are encoded according to their respective data type, whereby the thus-encoded data items are made up into a row of packs that is to be reproduced within a prescribed period of time and are stored into a unit, the data coding method comprising the steps of:
   determining an encoding rate,
   determining a target amount of codes for each data type that corresponds to the encoding rate,
   encoding the input data for each data type so that the coded data may be in conformity with the target amount of codes,
   determining, on the basis of the encoding rate and the target amount of codes, addresses of a reference unit for making a search and a prescribed number of units that are reproduced at least before and after the reference unit and an ending address at which there is ended at least data of the data type having its data items independently encoded, of the data within the unit,
   constructing as the unit the coded data that has been obtained by being encoded so that the coded data may be in conformity with the target amount of codes, and
   depicting at a foremost position of the unit the addresses of the unit and the ending address at which data of the data type having its data items independently encoded is ended.

2. A data coding method according to claim 1, wherein when the input data is encoded so that the coded data may be in conformity with the target amount of codes, the encoding of the input data is performed in a temporary amount of codes that has been prepared by setting the amount of codes to be at a value smaller by a prescribed amount of codes than the target amount of codes, and the difference between an amount of codes generated by the encoding performed into the temporary target amount of codes and the target amount of codes is adjusted using invalid bits, thereby encoding the input data so that the coded data may be in conformity with the target amount of codes.

3. A data coding method according to claim 1, wherein determination is made of a total amount of codes of the unit as a whole from the target amount of codes for each data type.

4. A data coding method according to claim 2, wherein determination is made of a total amount of codes of the unit as a whole from the target amount of codes for each data type.

5. A data coding apparatus wherein input data in prescribed data units is classified into a data type whose data items are independently encoded and a data type whose data items are encoded by being mutually related between each two thereof and the data items are encoded according to their respective data type, whereby the thus-encoded data items are made up into a row of packs that is to be reproduced within a prescribed period of time and are stored into a unit, the data coding apparatus comprising:
   encoding rate determining means for determining an encoding rate,
   target amount-of-code determining means for determining a target amount of codes for each data type that corresponds to the encoding rate,
   amount-of-code control means for encoding the input data for each data type so that the coded data may be in conformity with the target amount of codes,
   address determining means for determining, on the basis of the encoding rate and the target amount of codes, addresses of a reference unit for making a search and a prescribed number of units that are reproduced at least before and after the reference unit and an ending address at which there is ended at least data of the data type having its data items independently encoded, of the data within the unit,
   unifying means for constructing as the unit the coded data that has been obtained by being encoded so that the coded data may be in conformity with the target amount of codes, and
   depicting means for depicting at a foremost position of the unit the addresses of the unit and the ending address at which data of the data type having its data items independently encoded is ended.

6. A data coding apparatus according to claim 5, wherein the amount-of-code control means comprises:
   temporary target amount-of-code producing means for producing a temporary target amount of codes that has been prepared by setting the amount of codes to be at a value smaller by a prescribed amount of codes than the target amount of codes, and adjusting means for adjusting an amount of codes by adjusting the difference between an amount of codes generated by the encoding performed into the temporary target amount of codes and the target amount of codes by using invalid bits.

7. A data coding apparatus according to claim 5, wherein the amount-of-code control means determines a total amount of codes of the unit as a whole from the target amount of codes for each data type.

8. A data coding apparatus according to claim 6, wherein the amount-of-code control means determines a total amount of codes of the unit as a whole from the target amount of codes for each data type.

9. A data coding apparatus according to claim 5, wherein the target amount-of-code determining means has storage means having stored previously therein a target amount-of-code value for each data type that corresponds to a prescribed encoding rate.

10. A data coding apparatus according to claim 6, wherein the target amount-of-code determining means has storage means having stored previously therein a target amount-of-code value for each data type that corresponds to a prescribed encoding rate.

11. A data coding apparatus according to claim 7, wherein the target amount-of-code determining means has storage means having stored previously therein a target amount-of-code value for each data type that corresponds to a prescribed encoding rate.

12. A data coding apparatus according to claim 8, wherein the target amount-of-code determining means has storage means having stored previously therein a target amount-of-code value for each data type that corresponds to a prescribed encoding rate.

* * * * *